US010542088B2

(12) United States Patent
Macksood et al.

(10) Patent No.: US 10,542,088 B2
(45) Date of Patent: Jan. 21, 2020

(54) MODIFYING DATA RESOURCES WITHIN PARTY-PARTITIONED STORAGE AREAS

(71) Applicant: Microsoft Technology Licensing, LLC, Redmond, WA (US)

(72) Inventors: Azmil Macksood, Oslo (NO); Oystein Fledsberg, Trondheim (NO); Bard Kvalheim, Oslo (NO); Rezaul Hoque, Oslo (NO); Olav Hamang Bru, Oslo (NO); Helge Solheim, Oslo (NO); Vidar Knudsen, Oslo (NO); Kjetil Bergstrand, Oslo (NO); Simon Hult, Oslo (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 88 days.

(21) Appl. No.: 15/409,447

(22) Filed: Jan. 18, 2017

(65) Prior Publication Data

US 2018/0205792 A1    Jul. 19, 2018

(51) Int. Cl.
*G06F 15/16* (2006.01)
*H04L 29/08* (2006.01)
(Continued)

(52) U.S. Cl.
CPC ........ *H04L 67/1097* (2013.01); *G06F 16/273* (2019.01); *H04L 41/12* (2013.01);
(Continued)

(58) Field of Classification Search
CPC . H04L 67/1097; H04L 67/1095; H04L 51/04; G06F 17/30578
(Continued)

(56) References Cited

U.S. PATENT DOCUMENTS 5,220,657 A    6/1993 Bly et al.
5,555,371 A *  9/1996 Duyanovich ....... H04L 67/1095
                                                      714/13
(Continued)

FOREIGN PATENT DOCUMENTS

| CN | 104361034 A | 2/2015 |
| EP | 2947848 A1 | 11/2015 |
| WO | 2016153676 A1 | 9/2016 |

OTHER PUBLICATIONS

"International Search Report and Written Opinion Issued in PCT Application No. PCT/US2018/013677", dated Mar. 16, 2018, 11 Pages.
(Continued)

*Primary Examiner* — Bharat Barot
(74) *Attorney, Agent, or Firm* — Merchant & Gould

(57) ABSTRACT

A server system comprising a physically separate storage area for each of a plurality of respective parties including a first and second party, and a manager function for managing the storage. E.g. some of the storage areas may be in separate server units or at separate geographic locations. Each of at least some of the storage areas stores a primary instance of one or more data resources of the respective party. The manager function is configured so as, in response to the second party forming a relationship with one of the resources of the first party, establish a secondary copy of said one of the resources of the first party in the respective storage area of the second party. Further, when the primary instance is updated with a change, the manager function automatically propagates the change in the primary instance to the secondary copy in the second party's storage area.

20 Claims, 5 Drawing Sheets

(51) Int. Cl.
*H04L 12/24* (2006.01)
*H04L 12/58* (2006.01)
*G06F 16/27* (2019.01)

(52) U.S. Cl.
CPC .............. *H04L 51/04* (2013.01); *H04L 51/16* (2013.01); *H04L 67/06* (2013.01); *H04L 67/1095* (2013.01); *H04L 67/306* (2013.01)

(58) Field of Classification Search
USPC ................ 709/202–207, 213–216, 227–228
See application file for complete search history.

(56) References Cited

U.S. PATENT DOCUMENTS

| | | | |
|---|---|---|---|
| 7,263,537 B1* | 8/2007 | Lin | G06F 16/2308 |
| | | | 707/999.204 |
| 7,647,346 B2 | 1/2010 | Silverman et al. | |
| 8,099,463 B2 | 1/2012 | Horowitz et al. | |
| 8,181,111 B1 | 5/2012 | Onyon et al. | |
| 8,183,514 B2 | 5/2012 | Fujiwara et al. | |
| 8,250,145 B2 | 8/2012 | Zuckerberg et al. | |
| 8,453,068 B2 | 5/2013 | Stibel et al. | |
| 8,473,607 B2 | 6/2013 | Enscoe et al. | |
| 8,479,103 B2 | 7/2013 | DeLuca et al. | |
| 8,510,379 B2 | 8/2013 | Howes et al. | |
| 8,595,381 B2 | 11/2013 | Long | |
| 8,819,236 B2 | 8/2014 | Gkantsidis et al. | |
| 8,826,407 B2 | 9/2014 | Henderson | |
| 9,128,768 B2 | 9/2015 | Korovin et al. | |
| 9,135,304 B2* | 9/2015 | Oliver | G06F 16/24578 |
| 9,208,207 B2 | 12/2015 | Venkataramani et al. | |
| 9,219,736 B1 | 12/2015 | Lewis et al. | |
| 9,276,882 B2* | 3/2016 | Mok | H04L 51/04 |
| 9,317,574 B1 | 4/2016 | Brisebois et al. | |
| 9,378,241 B1 | 6/2016 | Shankar et al. | |
| 9,378,303 B1 | 6/2016 | Shankar et al. | |
| 9,390,159 B2 | 7/2016 | Junkergard et al. | |
| 9,396,242 B2 | 7/2016 | Varley et al. | |
| 9,424,330 B2 | 8/2016 | Prasanna | |
| 9,465,830 B2 | 10/2016 | Wable et al. | |
| 9,588,849 B2 | 3/2017 | Sinha | |
| 9,779,260 B1 | 10/2017 | Brisebois et al. | |
| 9,842,218 B1 | 12/2017 | Brisebois et al. | |
| 9,842,220 B1 | 12/2017 | Brisebois et al. | |
| 9,847,994 B1 | 12/2017 | Kelly et al. | |
| 9,928,005 B2 | 3/2018 | Sinha | |
| 9,940,377 B1* | 4/2018 | Sait | H04L 67/1097 |
| 9,990,506 B1 | 6/2018 | Brisebois et al. | |
| 2004/0064511 A1 | 4/2004 | Abdel-aziz et al. | |
| 2004/0068523 A1 | 4/2004 | Keith et al. | |
| 2005/0044246 A1* | 2/2005 | Kawabata | H04L 63/101 |
| | | | 709/215 |
| 2006/0253500 A1* | 11/2006 | Kapur | G06F 16/273 |
| | | | 707/999.2 |
| 2007/0156670 A1 | 7/2007 | Lim | |
| 2008/0059474 A1 | 3/2008 | Lim | |
| 2008/0208963 A1* | 8/2008 | Eyal | H04L 67/1091 |
| | | | 709/203 |
| 2008/0222108 A1 | 9/2008 | Prahlad et al. | |
| 2010/0081417 A1 | 4/2010 | Hickie | |
| 2010/0269158 A1 | 10/2010 | Ehler et al. | |
| 2011/0093471 A1 | 4/2011 | Brockway et al. | |
| 2013/0066833 A1 | 3/2013 | Aikas et al. | |
| 2013/0139191 A1 | 5/2013 | Ren | |
| 2013/0155068 A1 | 6/2013 | Bier et al. | |
| 2013/0225284 A1* | 8/2013 | Lenger | G07F 17/3241 |
| | | | 463/29 |
| 2013/0229429 A1 | 9/2013 | Mi et al. | |
| 2013/0262396 A1 | 10/2013 | Kripalani et al. | |
| 2014/0114940 A1 | 4/2014 | Prahlad et al. | |
| 2014/0279893 A1 | 9/2014 | Branton | |
| 2015/0032686 A1 | 1/2015 | Kuchoor | |
| 2015/0089514 A1 | 3/2015 | Grewal et al. | |
| 2015/0124820 A1 | 5/2015 | Alizadeh attar et al. | |
| 2015/0149898 A1 | 5/2015 | Worrall et al. | |
| 2015/0156263 A1* | 6/2015 | Clayton | H04L 67/1095 |
| | | | 709/217 |
| 2015/0163206 A1 | 6/2015 | Mccarthy et al. | |
| 2015/0169716 A1 | 6/2015 | Franklin et al. | |
| 2015/0186492 A1 | 7/2015 | Shalita et al. | |
| 2015/0186668 A1 | 7/2015 | Whaley et al. | |
| 2015/0200948 A1 | 7/2015 | Cairns et al. | |
| 2015/0215390 A1* | 7/2015 | Yerli | G06F 16/93 |
| | | | 715/753 |
| 2015/0242466 A1 | 8/2015 | Alexander et al. | |
| 2015/0294377 A1 | 10/2015 | Chow | |
| 2015/0301903 A1 | 10/2015 | Mutha et al. | |
| 2015/0363270 A1 | 12/2015 | Hammer | |
| 2016/0019224 A1 | 1/2016 | Ahn et al. | |
| 2016/0021037 A1 | 1/2016 | Hewitt et al. | |
| 2016/0026704 A1 | 1/2016 | Strong et al. | |
| 2016/0055248 A1 | 2/2016 | Goel et al. | |
| 2016/0078245 A1 | 3/2016 | Amarendran et al. | |
| 2016/0188591 A1 | 6/2016 | Bestler et al. | |
| 2016/0188599 A1 | 6/2016 | Maarek et al. | |
| 2016/0191509 A1 | 6/2016 | Bestler et al. | |
| 2016/0191618 A1* | 6/2016 | Shi | H04L 67/1095 |
| | | | 707/610 |
| 2016/0210202 A1 | 7/2016 | Sinha | |
| 2016/0283085 A1* | 9/2016 | Beausoleil | H04L 67/1097 |
| 2016/0300141 A1 | 10/2016 | Veeraragavan et al. | |
| 2016/0359856 A1 | 12/2016 | Wang et al. | |
| 2017/0006020 A1 | 1/2017 | Falodiya | |
| 2017/0039145 A1 | 2/2017 | Wu et al. | |
| 2017/0041296 A1 | 2/2017 | Ford et al. | |
| 2017/0048222 A1 | 2/2017 | Wise | |
| 2017/0060918 A1 | 3/2017 | Iyer et al. | |
| 2017/0131912 A1 | 5/2017 | Sinha | |
| 2017/0142094 A1 | 5/2017 | Doitch et al. | |
| 2017/0228387 A1 | 8/2017 | Ahn et al. | |
| 2017/0250816 A1 | 8/2017 | Popa et al. | |
| 2018/0047072 A1 | 2/2018 | Chow | |
| 2018/0081887 A1 | 3/2018 | Ahn et al. | |
| 2018/0107838 A1 | 4/2018 | Amarendran et al. | |
| 2018/0173372 A1 | 6/2018 | Greenspan et al. | |
| 2018/0181314 A1 | 6/2018 | Dhuse et al. | |
| 2018/0203770 A1 | 7/2018 | Tennoe et al. | |
| 2018/0203869 A1 | 7/2018 | Henriques et al. | |
| 2018/0205739 A1 | 7/2018 | Sommerfelt et al. | |
| 2018/0219687 A1 | 8/2018 | Popa et al. | |

OTHER PUBLICATIONS

Krishnanunni, "Building a Social Inbox using MongoDB", http://suyati.com/webinar/social-inbox-mongodb/, Retrieved on: Dec. 27, 2016, 9 pages.
Bronson, et al., "TAO: Facebook's Distributed Data Store for the Social Graph", In Proceedings of USENIX Annual Technical Conference, Jun. 26, 2013, pp. 49-60.
"Android Pay—A fast, simple way to pay", Retrieved from: https://developers.google.com/pay/, Retrieved on: Jan. 4, 2017, 2 Pages.
"App authentication with Microsoft Graph", Retrieved from: https://web.archive.org/web/20170130170539/https://graph.microsoft.io/en-us/docs/authorization/auth_overview, Retrieved on: Jan. 4, 2017, 4 Pages.
"Easily Allow a User to Access another User's Mailbox", Retrieved from: https://docs.microsoft.com/en-us/previous-versions/technet-magazine/ff381460(v=msdn.10), Retrieved on: Jan. 4, 2017, 2 Pages.
"Javascript Object Signing and Encryption (JOSE)", Retrieved from: https://jose.readthedocs.io/en/latest/, 2014, 6 Pages.
"JSON Web Tokens", Retrieved from: https://jwt.io/, Retrieved on: Jan. 4, 2017, 6 Pages.
"Knowledge Center—Extending Kaltura—Programming Using API and Plugins", Retrieved from: https://knowledge.kaltura.com/expertise/extending-kaltura-programming-using-api-and-plugins, Oct. 17, 2013, 54 Pages.
"Ldp Overview", Retrieved from: https://docs.microsoft.com/en-us/previous-versions/windows/it-pro/windows-server-2003/cc772839(v=ws.10), Mar. 28, 2003, 2 Pages.

(56) References Cited

OTHER PUBLICATIONS

"Microsoft Azure", Retrieved from: https://docs.microsoft.com/en-us/azure/, Retrieved on: Jan. 4, 2017, 3 Pages.

"Microsoft Graph permission scopes", Retrieved from: https://graph.microsoft.io/en-us/docs/authorization/permission_scopes, Retrieved on: Jan. 4, 2017, 10 Pages.

"Outlook Dev Center—OAuth Sandbox", Retrieved from: https://oauthplay.azurewebsites.net/, Retrieved on: Jan. 4, 2017, 3 Pages.

"Query the Office graph using GQL and SharePoint Online Search REST APis", Retrieved From: https://developer.microsoft.com/en-us/graph/docs/api-reference/beta/resources/social_overview, Retrieved on: Jan. 4, 2017, 12 Pages.

"Tenant Isolation in Microsoft Office 365", Retrieved from: https://docs.microsoft.com/en-us/office365/securitycompliance/office-365-tenant-isolation-overview, Nov. 9, 2016, pp. 1-15.

"Non Final Office Action Issued in U.S. Appl. No. 15/409,451", dated Sep. 27, 2018, 15 Pages.

"Non Final Office Action Issued in U.S. Appl. No. 15/409,466", dated Oct. 10, 2018, 12 Pages.

Altimore, et al., "Quickstart for the Azure AD Graph API", Retrieved from: https://docs.microsoft.com/en-us/azure/active-directory/develop/active-directory-graph-api-quickstart, Sep. 16, 2016, 7 Pages.

Bodriagov, et al., "Access control in decentralized online social networks: Applying a policy-hiding cryptographic scheme and evaluating its performance", In Proceedings of the IEEE International Conference on Pervasive Computing and Communications Workshops, Mar. 24, 2014, pp. 622-628.

Dubey, et al., "Weaver: A High Performance, Transactional Graph Database Based on Refinable Timestamps", In Proceedings of the VLDB Endowment, vol. 9, No. 11, Jul. 1, 2016, 12 Pages.

Ghemawat, et al., "The Google File System", In Proceedings of the 19th ACM SIGOPS Operating Systems review, vol. 37, Issue 5, Oct. 19, 2003, pp. 29-43.

Grolinger, et al., "Data management in cloud environments: NoSQL and NewSQL data stores", In Journal of Cloud Computing: Advances, Systems and Applications, vol. 2, Issue 1, Dec. 1, 2013, pp. 1-24.

Hardt, D., "The OAuth 2.0 Authorization Framework", Retrieved from: https://tools.ietf.org/html/rfc6749, Oct. 2012, 76 Pages.

Hoschek, et al., "Data Management in an International Data Grid Project", In Proceedings of First IEEE/ACM International Workshop on Grid Computing, Dec. 17, 2000, 15 Pages.

Jones, et al., "JSON Web Token (JWT)", Retrieved from: http://self-issued.info/docs/draft-ietf-oauth-json-web-token.html, May, 2015, 19 Pages.

Jones, et al., "JSON Web Token (JWT) Profile for OAuth 2.0 Client Authentication and Authorization Grants", Retrieved from: https://tools.ietf.org/html/draft-ietf-oauth-jwt-bearer-11, Oct. 21, 2014, 10 Pages.

Lamos, et al., "Azure Active Directory developer's guide", Retrieved from: https://docs.microsoft.com/en-us/azure/active-directory-developers-guide, Sep. 12, 2016, 7 Pages.

Lamos, et al., "Azure AD token reference", Retrieved From: https://docs.microsoft.com/en-us/azure/active-directory/develop/id-tokens, Jun. 10, 2016, 15 Pages.

Lefferts, Rob, "Today at Connect( )—introducing the Microsoft Graph", Retrieved from: https://web.archive.org/web/20170320072655/https://blogs.office.com/2015/11/18/today-at-connect-introducing-the-microsoft-graph/, Nov. 18, 2015, 5 Pages.

"International Search Report and Written Opinion Issued in PCT Application No. PCT/US2018/013675", dated Mar. 9, 2018, 11 Pages.

"International Search Report and Written Opinion Issued in PCT Application No. PCT/US2018/013678", dated Mar. 28, 2018, 13 Pages.

"International Search Report and Written Opinion Issued in PCT Application No. PCT/US2018/013679", dated Mar. 20, 2018, 10 Pages.

Raykova, et al., "Privacy Enhanced Access Control for Outsourced Data Sharing", In Proceedings of the 16th International Conference on Financial Cryptography and Data Security, Feb. 27, 2012, pp. 1-15.

Wang, et al., "Achieving distributed user access control in sensor networks", In Journal of Ad Hoc Networks, vol. 10, Issue 3, Jan. 25, 2011, pp. 1-12.

"Final Office Action Issued in U.S. Appl. No. 15/409,451", dated Apr. 25, 2019, 18 Pages.

"Final Office Action Issued in U.S. Appl. No. 15/409,466", dated May 8, 2019, 11 Pages.

"Non-Final Office Action Issued in U.S. Appl. No. 15/409,464", dated Jul. 3, 2019, 23 Pages.

"Notice of Allowance Issued in U.S. Appl. No. 15/409,466", dated Jul. 18, 2019, 10 Pages.

"Examiner Initiated Interview Summary Issued in U.S. Appl. No. 15/409,451", dated Aug. 9, 2019, 1 Page.

"Non-Final Office Action Issued in U.S. Appl. No. 15/409,451", dated Oct. 18, 2019, 19 Pages.

* cited by examiner

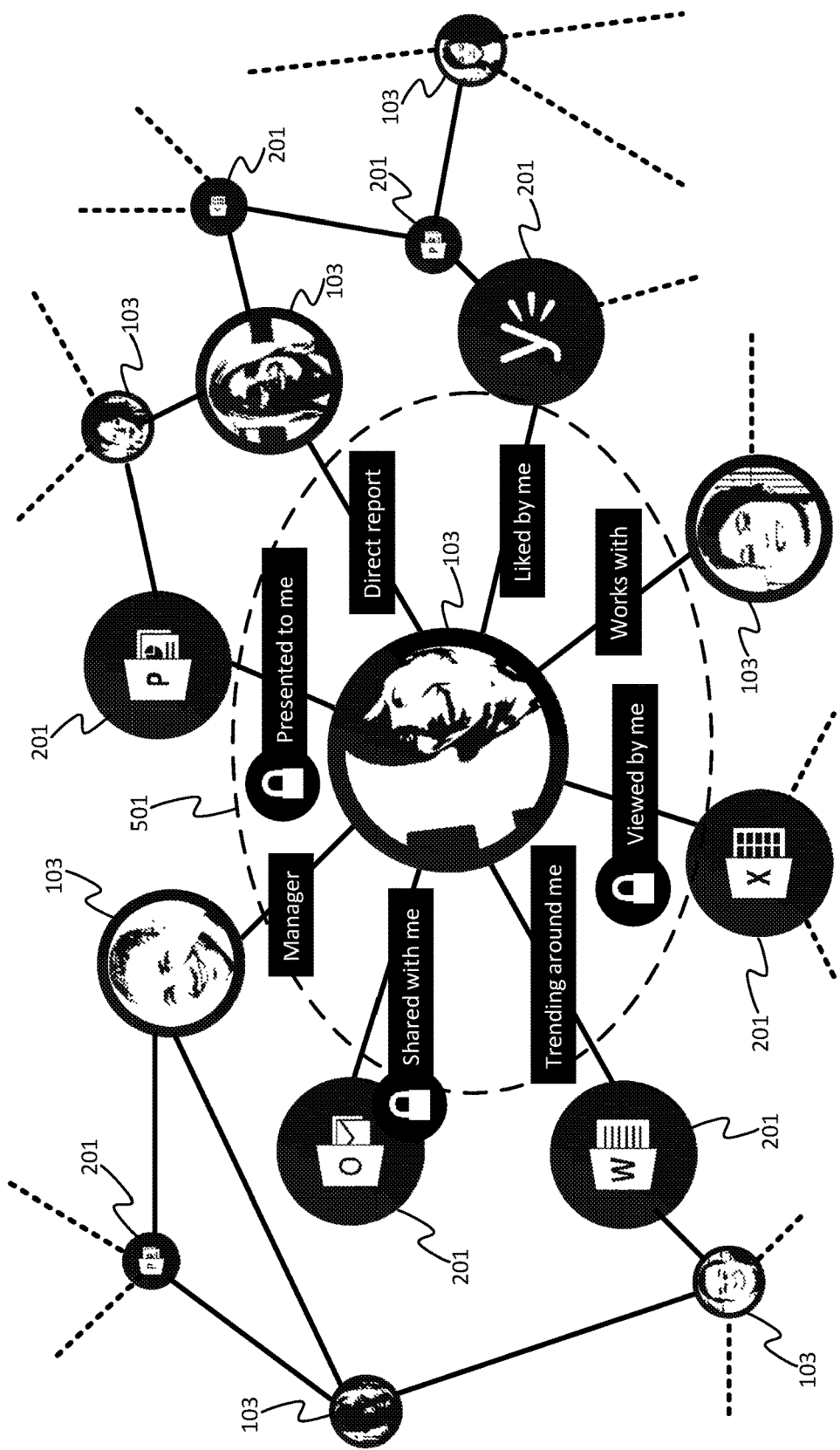

MODIFYING DATA RESOURCES WITHIN PARTY-PARTITIONED STORAGE AREAS

BACKGROUND

As the number of users and applications around the world grows, there is an ever increasing need for more and more data storage for storing various resources. These resources may include for example: files such as spreadsheets, word processing documents, slide presentations, images, videos, etc.; stored communication histories such as emails, IM chat history, etc.; user profile information such as contact details, social media profiles, etc.; and/or sites such as websites, document sharing sites, etc. Such resources may originate from a variety of applications installed on the users' terminals and/or hosted online, such as word processing applications, spreadsheet applications, social media applications, file sharing applications, etc.

Online storage has grown in popularity. Using online storage such resources can be stored online on the "cloud", meaning the resources are stored on a server system accessible via the Internet, the server system typically comprising multiple server units implemented in more than one data centre and/or geographic location. Techniques for distributed storage and processing via a network such as the Internet are known in the art.

It is also known for users to make their own resources available to other users, such as those within the same organization (e.g. company). For instance this may allow one or more other users to view the resource, subscribe to updates to the resource, or even modify the resource.

SUMMARY

However, existing systems do not scale well. In conventional systems there is a single master copy of a given resource stored in a single storage location associated with the user who owns the resource (e.g. file, site, etc.). If the resource is made available to one or more other users to view, modify, or the like, then all users access the same centralized master copy. In order to scale such a system to accommodate making resources available to more users, the processing resources of the server unit on which the resources are stored have to be upgraded, such as by upgrading the CPU or adding more RAM.

In the present disclosure on the other hand, when a first user's resource (e.g. file, etc.) is made available to a second, other user, then this resource is duplicated into a storage location of the second user (or more generally this may apply to the storage areas of first and second parties, where each party may be an individual user or a group of users such as a team within an organization).

Hence according to one aspect disclosed herein, there is provided a server system comprising a physically separate storage area for each of a plurality of respective parties including a first party and a second party, and further comprising a manager function for managing the storage. For instance some of the storage areas, such as those of the first and second parties, may be implemented in separate server units with separate housings or even at separate geographic locations. Each of at least some of the storage areas stores a primary instance of one or more data resources of the respective party. The manager function is configured so as, in response to the second party forming a relationship with one of the resources of the first party, to establish a secondary copy of said one of the resources of the first party in the respective storage area of the second party. Furthermore, when the primary instance is updated with a change, the manager function propagates the change in the primary copy to the secondary copy in the second party's storage area.

By duplicating the resources of a first user in a storage location of a second user, this means that in order to scale the system, one need only add more server units with a conventional processing power, rather than needing to upgrade the processing power of a given unit. Thus the disclosed system advantageously trades-off increased redundancy for improved saleability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
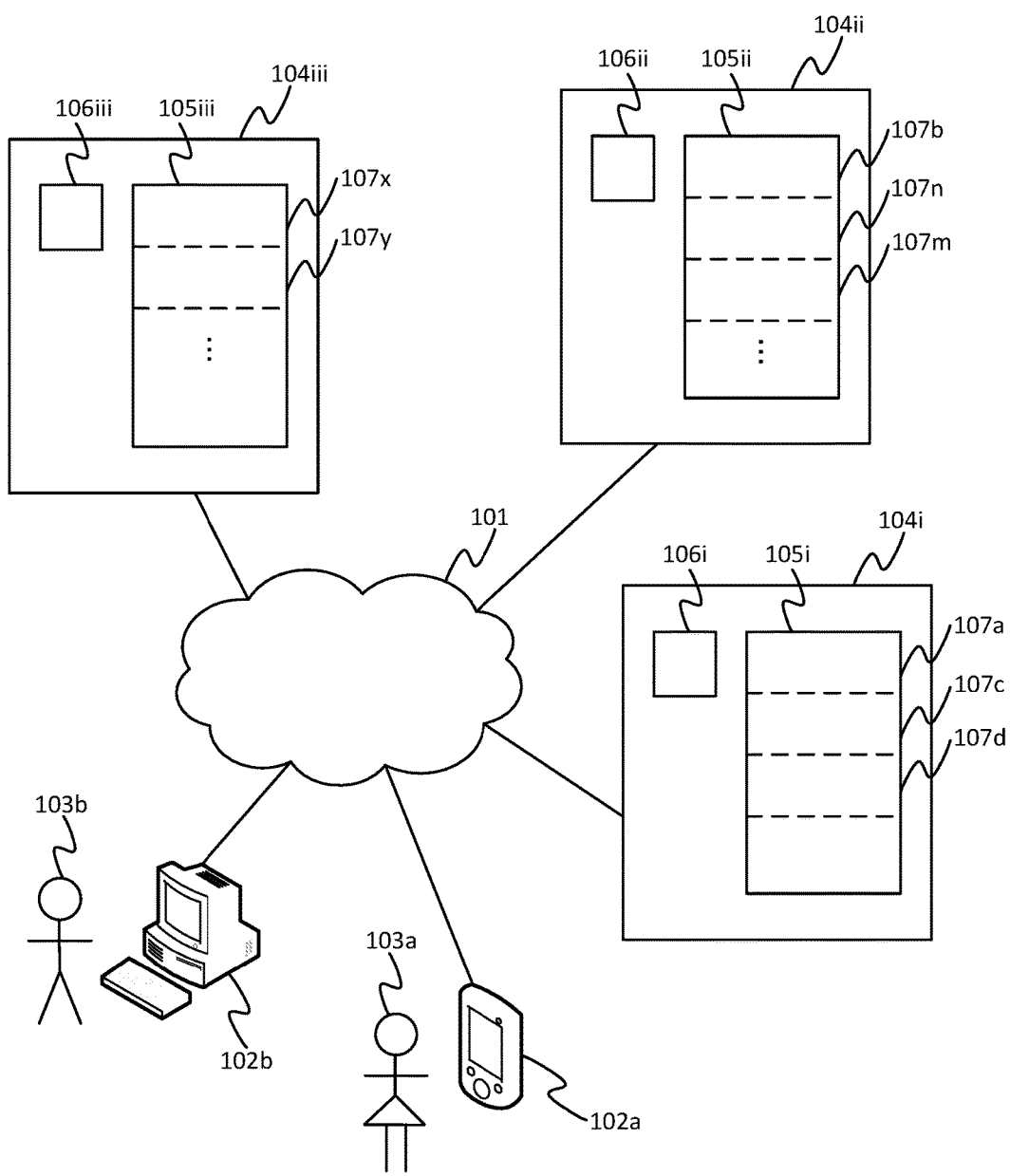
FIG. 1 is a schematic block diagram of a storage system.

FIG. 1 shows a server system in accordance with embodiments of the present disclosure. The server system comprises a plurality of server units 104, each for example being a distinct module (separate casing) on a server rack, or being located in a different room or data centre. Some or all of the server units 104 may even be located at different geographic locations, including the possibility of different towns, cities, counties, states, countries or even continents. Each server unit comprises a respective memory 105 formed of one or more memory devices, which may comprise for example one or more magnetic memory devices such as one or more hard drives and/or one or more electronic memory devices such as one or more solid state drives (SSD), or a combination of any such memory devices. By way of illustration only three server units 104*i*, 104*ii*, 104*iii* and their respective memories 105*i*, 105*ii*, 105*iii* are shown in FIG. 1, but it will be appreciated that many more may in fact be included in the system.

The server units 104 are networked together via a suitable packet-switched network 101, e.g. a wide-area internetwork such as that commonly referred to as the Internet, or a private intranet. Network may be implemented by any suitable wired and or wireless communication medium or media, e.g. the wired infrastructure of the internet, and/or one or more wireless networks such as a wireless cellular network, wireless local area network(s), etc. By whatever means implemented, the network 101 enables the server units 104 to act together to provide a distributed storage system accessible to users 103 from their respective user terminals 102 via the network 101. Each user terminal 102 may take any suitable for accessing the network 101 via a wired or wireless connection, e.g. a desktop computer, laptop computer, tablet, smartphone, smartwatch or a pair of smart-glasses (and the different user terminals do not all have to take the same form). Two particular users 103a (a first user, Alice) and 103b (a second user, Bob) and their respective user terminals 102a, 102b are shown in FIG. 1 by way of illustration, but again it will be appreciated that the system may serve many more users 103 who access the system from many respective user terminals 102.

By way of example, the server system may be arranged to provide storage services to a plurality of organizations being customers or "tenants" of the provider of the system.

Figure 4:
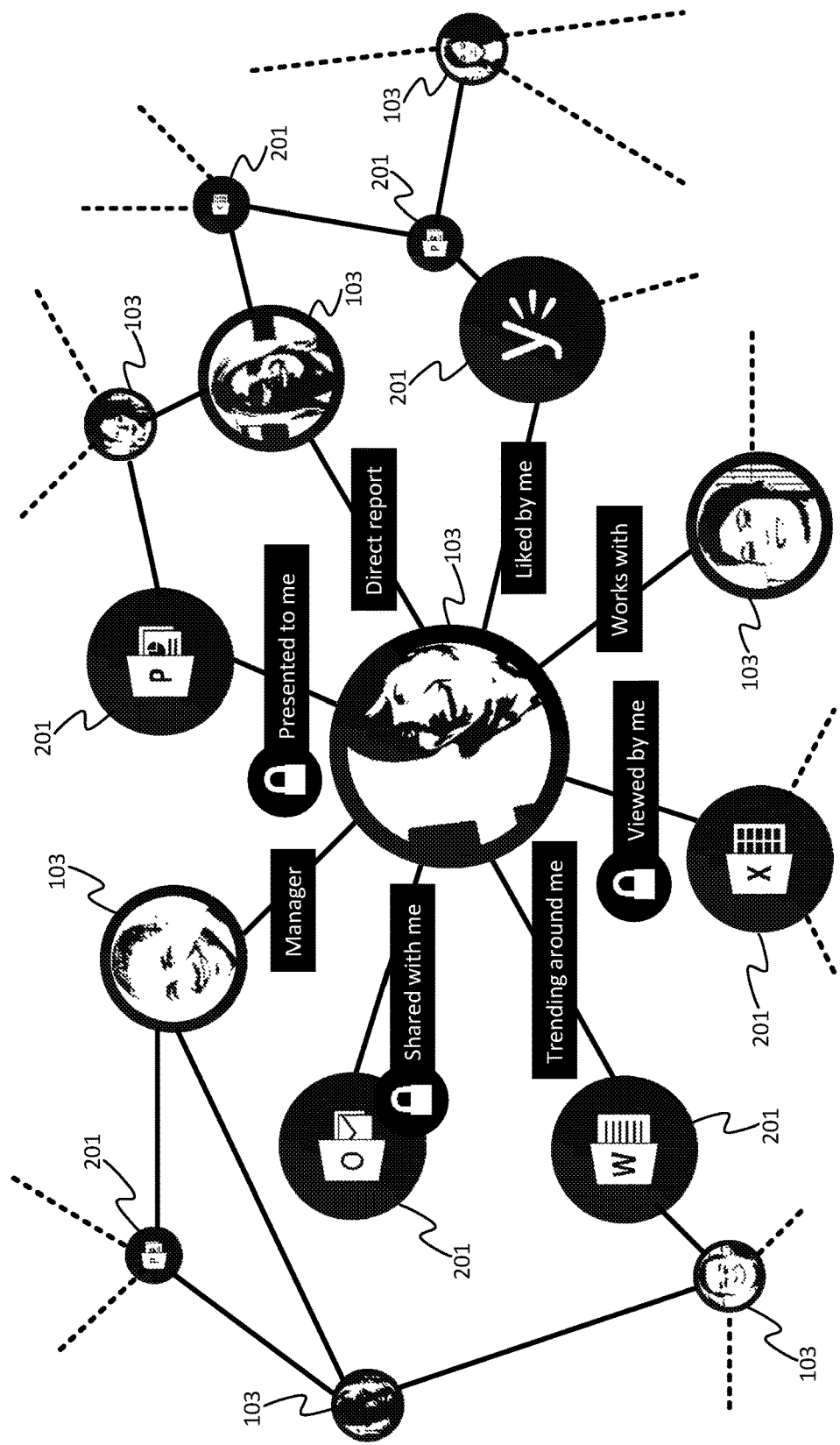

Referring also to FIG. 4, the server system stores data resources 201, where each data resources may comprise any item or collection of digital information, e.g. a file, a stored communication, user profile information, or a site of some kind. Examples of files include word processing documents, spreadsheets, slide decks, images, videos, etc. Examples of stored communications include emails, or IM (instant messaging) chat histories. Examples of user profile information include contact details (e.g. "contact cards") and social media profiles. Examples of sites include document sharing sites, websites, and collaborative sites. Anywhere where a resource is referred to herein, this may refer to any of the above-mentioned resources or others (and the different resources need not all by of the same type).

The memories 105 of the server units 104 store the resources 201 (e.g. files, emails, etc.) of the various users 103, wherein the users can make these stored resources available to others of the users within the organization to enable them perform a certain activity or activities, such as to view or modify the resources to which they have access. Where a user has access to a certain resource, the user may be described as having relationship with that resource, wherein the relationship may be qualified in terms of what activity the user is permitted to perform (e.g. view, modify) and/or the means by which the user came into contact with the resource (e.g. shared with the user, trending around the user, etc.). The server system maintains a graph of all the relationships between users and resources in the organization. The graph also records the qualities of the relationships, i.e. the manner in which the user is related to the resource (viewed by the user, modified by the user, shared with the user, trending around the user, etc.).

The graph is maintained by a manager function 106. In accordance with embodiments disclosed herein, the manager function 106 is implemented in the form of a distributed function, i.e. with a respective instance of the manager function 106i, 106ii, 106iii running on each of the server units 104i, 104ii, 104iii. Each instance of the manager function 106 takes the form of software stored on part of the memory 105 of the respective server unit 104 and arranged to run on a respective processing apparatus (not shown) of the respective server unit 104 (the processing apparatus comprising one or more microprocessors each with one or more cores). Note also that the possibility of a centralized manager function is not excluded.

Figure 3:
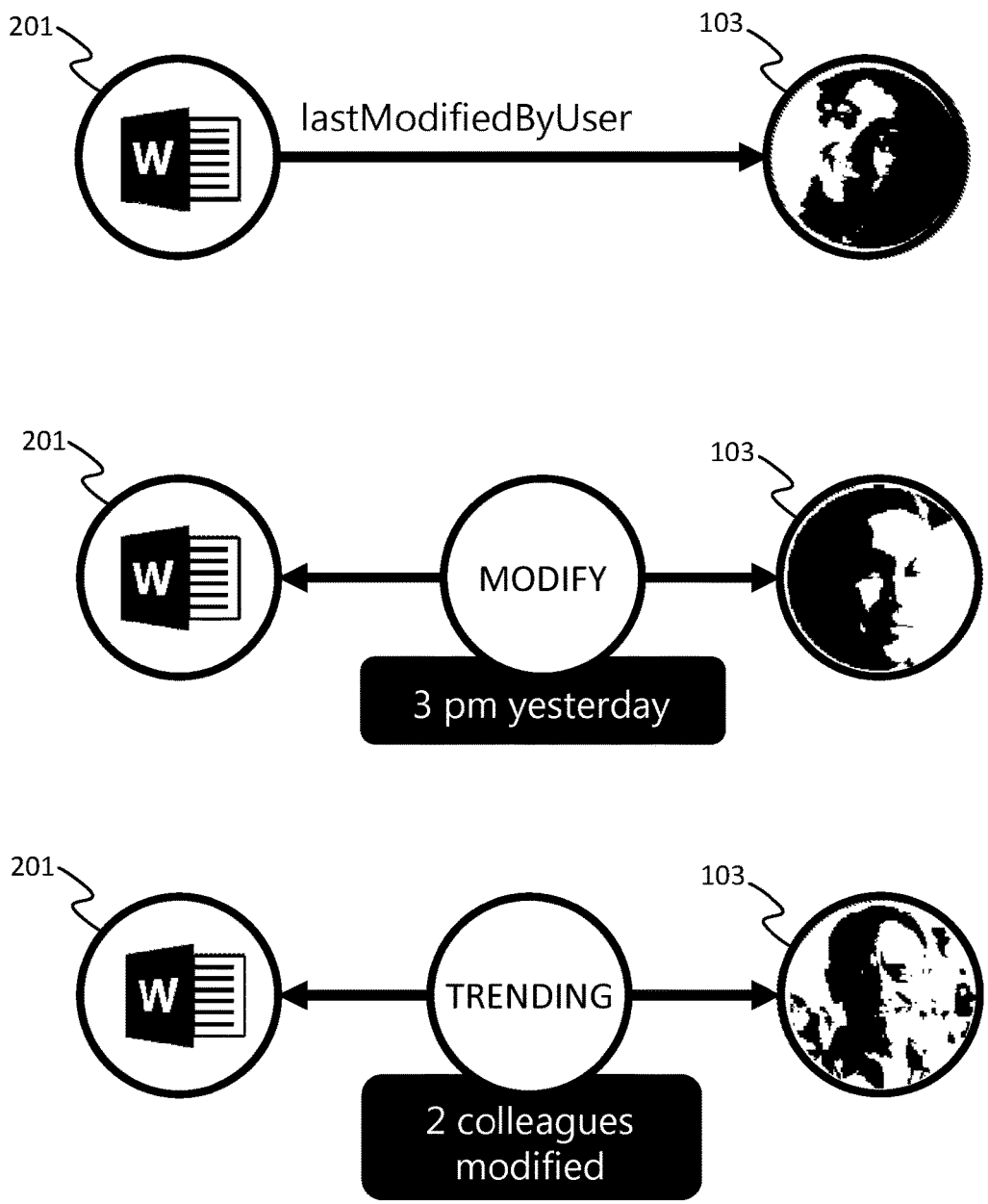
FIG. 3 is a schematic illustration of example relationships between a user and a resource, FIG. 4 schematically illustrates a graph of relationships between users and resources, and FIG. 5 schematically illustrations a partitioning of the graph of FIG. 4.

Some examples of graph relationships are illustrated schematically in FIG. 3. The top diagram in FIG. 3 illustrates an example of a basic relationship, which is a direct navigation from one object to another. That is, the relationship defines how a user 103 is related to the resource 201 in question, for instance an action the user 103 has performed in relation to the resource 201 (e.g. the fact that the resource was last modified by that user), and/or the manner in which the user 103 has come into contact with the resource 201 (e.g. shared with the user by another user). Another example of such a relationship is when the user 103 has subscribed to a given resource 201. In this case the user 103 registers with the manager function 106 to receive a notification whenever the specified resource 201 is updated by another user, and the manager function 106 automatically provides the notification when such an update occurs.

The middle diagram in FIG. 3 shows and example of a rich relationship. A rich relationship is one supplemented by metadata, and can connect to one or more objects. The metadata may for example define a time at which the user 103 performed a certain action (activity) in relation to the resource 201, such as the time at which it was last modified by that user.

The bottom diagram in FIG. 3 shows an example of an "insight". An insight is an inferred rich relationship created automatically by an intelligence layer of the manager function 106. An example of an inferred relationship is trending. Trending occurs when beyond a threshold number of predefined actions are detected by the manager function 106 to have been performed in relation to a given resource 201 by one or more predefined other users associated with the user 103 in question. For instance the predefined users may be the contacts of the target user 103, or users in a same group such as the same department within the organization or the same interest group. So for example, if a given resource 201 (e.g. file) has been viewed more than X times by the user's contacts or other users in a certain specified group, the resource will be declared as trending around that user.

All such information is maintained in the graph by the manager function 106, being updated when relationships are created or changed.

If the graph was to be implemented as a single organization-wide graph, then to scale a large system with many users, the graph could only grow by adding more powerful hardware, such as more powerful CPUs, more RAM etc. The presently-disclosed system provides a solution to this by instead partitioning and partially replicating portions of the graph across many per-user mailboxes, thus allowing the graph size to be scaled by adding further server units instead of upgrading the computing power of a given unit.

The graph is conceptually a global interconnected graph across an organization ("tenancy"). However, in accordance with the presently disclosed techniques it is also divided into personal, user site specific graphs with personalized views.

Referring again to FIG. 1, each of the users 103 is allocated his/her own home partition 107, or "shard", in the memory of one or the server units 104. This partition comprises a personal mailbox of the respective user. Further, the graph is divided into a personal view 501 of the graph for each user 103 (see FIG. 5), and this fragment of the graph along with the resources 201 to which the respective user 103 is related via this fragment 501 of the graph are stored in the respective mailbox 107 of that user. Where two users are related to the same resource 201, the resource is copied into the mailbox of one of the users. The primary copy of the resource 201 is stored in the mailbox of the user that owns the data, and a secondary copy is stored in the mailbox of each other user 103 having a relationship in the graph with the resource 201.

Thus, a tenant-wide graph such as that shown in FIG. 4, showing lots of users, files, other items and the user's actions on the objects, is split into mailboxes ("shards") as represented in FIG. 5.

Each of the mailboxes 107 is implemented on a physically separate respective region of memory. The mailboxes 107a,

107*b* of any two given users 102*a*, 102*b* may be implemented in the memories 105*i*, 105*ii* of different server units 104*i*, 104*ii*, which may be in different separately removable and replaceable physical modules in the same data centre, or different data centres, or even different geographical regions such as different towns, cities, counties, states or countries or even continents. The various server units 104 are networked together via the network 101 and controlled by the distributed manager function 106 in order to work together to provide the functionality described herein. Sometimes, the mailboxes of any two given users may happen be found in different physical regions of the memory 105 of the same server unit, but the mailboxes are still kept with distinct views 501 of the graph and distinct copies of the respective resources 201 in distinct areas of memory.

Wherever the mailboxes 107*a*, 107*b* are implemented, the manager function 106 is configured to establish a respective copy of any resource (file, email, etc.) that is common (within the graph) to more than one user 103 in each of the users' mailboxes 107.

The copy in the mailbox of the user that owns the resource is deemed the primary copy, or synonymously the "master" copy. The owner may for example be the author of the resource or the user that first introduced the resource into the system. In embodiments the manager function 106 is configured with a set of one or more ownership rules for defining who is the owner of a given resource 201 and where the master (i.e. primary) instance of each resources is to be stored (i.e. which user's mailbox 107 or "shard"). Examples of these ownership rules will be discussed in more detail shortly.

The copy in any other user's mailbox 107 is deemed a secondary copy. When any such other user wishes to access the resource such as to view the resource, they view the copy in their own mailbox 107. If there is any subsequent modification to the resource, the modification is made to the primary copy and the manager 106 is configured to then automatically propagate the modification to each secondary copy connected to the primary copy of the graph.

In contrast with the present disclosure, in conventional systems there would be only one single master instance of any given resource, whereby, if made available to other users, all users would access that same single master copy. This would suffer from the scalability issue similar to that described above. However, with a respective fragment 501 of the graph and copies of the respective resources 201 replicated across separate mailboxes 107 of each respective user 103, then each of the mailboxes can be implemented on any server unit an moved between server units 104 in a modular fashion. Hence to expand the system to accommodate more connections in the graph, the provider can simply add more server units 104 and redistribute the mailboxes 107 of different users 103 between server units 104 as necessary.

Preferably the mailbox 107 of a given user 103 is located on a server unit 104 that is located in a same geographic region as that respective user 103. If the manager function 106 is informed or detects (e.g. from persistent use of a new IP address) that the user 103 has moved home to a new geographic location, it may migrate the mailbox 107 to a new geographic location within that new geographic region accordingly. This can be readily effected because the mailboxes 107 are all modular in fashion.

Each copy in each mailbox may also comprise metadata (i.e. a "tag" or label) recording one or more properties of the resource, e.g. qualifying the relationship between the respective user and the resource, and/or some absolute property of the resource such as the last time it was modified by any user. Metadata qualifying the relationship is stored as a property on the direct object of the relationship. When the secondary copy is created, some (but not necessarily all) of the metadata from the primary copy may be duplicated in the secondary copy; and when the primary copy is modified, some (but not necessarily all) of any corresponding changes in the metadata may be propagated to the secondary copy/copies. This will be described in more detail shortly with reference to FIG. 2.

The primary copy may comprise a list defining which other users or groups of users are allowed to access the resource. I.e. not all users can necessarily obtain a secondary copy of a given resource 201—the manager function 106 may be configured to consult this list to determine whether a given other user is entitled to be connected to the resource in the graph and obtain a secondary copy in his/her mailbox.

In embodiments, the graph is limited to a given organization (e.g. company), such that user's outside the organization cannot form relationships with, nor gain access to, the resources of users within the organization. This advantageously allows the provider of the server system to provide storage services to multiple organizations without disclosure of potentially sensitive information between organizations. E.g. if the provider provides storage services to two rival cola companies, the companies would want to keep their data firmly secret form one another. However it is not excluded that in other embodiments the graph could span multiple organizations or even be global to all users.

On a point of terminology, note that the term "copy" is used herein in the sense of one of multiple instances of the same document or other such resource. "Primary copy" or "master copy" does not necessarily mean the primary or master instance is a copy in the sense of a duplicate or reproduction from some other original. The master/primary copy could be the original instance, or could be originated from an original instance stored elsewhere (not part of the graph system) such that the master copy is the master within the graph but not the ultimate original copy, and could e.g. contain just extracted text or other content from the original instance, or could include a link to the content of the original instance. "Secondary" however does mean that the secondary copy is generated from the master (primary copy).

Note also, while embodiments are described herein in terms of individual users 103, one, some or all of the mailboxes (and the copies of the resources 201 and fragment of the graph 501 stored therein) could in fact be that of a particular group of users such as a team within an organization. Hence group data such as group conversations, collaborative documents or collaborative work sites may be stored in group mailboxes, and such group content may be shared with other users or other groups. Wherever a user is referred to in this description, this could more generally be any party consisting of a single user or a defined group of users.

Further, use of the term "mailbox" in the description herein does not mean the resources 201 are limited to being emails or any other form of mail. As discussed above, the resources 201 of which primary and secondary copies are stored in the various users' mailboxes 107 may take any of a variety of forms such as files, communications, sites and/or user profile information.

In embodiments the manager function 106 uses email as the medium by which to send the data from one user's storage area 107 to another's in order to create the secondary copy from the primary copy, and/or as the medium by which to propagate changes in the primary copy to the secondary copy. This does not mean the end-user 103 receives an email, but rather the manager function 106 uses email "behind the scenes". E.g. consider the creation of a secondary copy of a resource into a mailbox 107*b* of a second user 103*b* on a second server unit 104*ii* from a primary copy in a mailbox 107*a* of a first user 103*a* on a first server unit 104*a*, or the propagation of a modification from the primary to the secondary copy. The instance of the manager function 106*i* on the first server unit 104*i* sends an email to the instance 106*ii* on the second server unit 104*ii*, the email containing the data for making the secondary copy or for propagating the change, and the receiving instance 106*ii* of the manager function intercepts this email and acts upon it, without the email being actually presented as a received email to the end-user 103*b* of the receiving mailbox 107*ii*. Hence in embodiments, the graph is partitioned down into email mailboxes to enable it to be implemented through an email platform. The email platform provides a persistent messaging queue for maintaining secondary copies by asynchronous messaging.

However, this is not limiting, and in other embodiments other communication media could be used, e.g. a proprietary protocol for propagating the secondary copies and modifications. For avoidance of doubt, anywhere a mailbox is referred to in the present description, this may equally be replaced with an alternate term such as "storage area", "user area", "storage compartment" or the like. In accordance with terminology introduced herein, this may also be referred to as a "shard".

Regardless of the medium by which changes are propagated, the manager function 106 implements ownership rules for determining where resources 201 are mastered, and rules for establishing and maintaining secondary copies.

The ownership rules define which user 103 is the owner of each given resource 201 and therefore whose mailbox 107 stores the primary copy. In embodiments the disclosed server system, including the manager function 106 and the graph it maintains, are configured to work in conjunction with an underlying file system operated by the provider of the server system, and/or to work in conjunction with a partner file system operated by a third party, or such like. E.g. these could include a cloud storage service, a file sharing service or site, a collaborative document sharing site, etc. Alternatively or additionally, the server system may be configured to work in conjunction with a local file system on each of one or more of the user's user terminals 102. The ownership rules implemented by the manager function 106 by being configured to map resources in the user's local or online file libraries, accounts, and/or sites, etc. onto primary instances in the mailboxes 107 of the user 103, thereby creating a consistent mapping of nodes and relationships in a global graph down to the mailboxes 107 (or more generally storage areas or "shards").

For instance, a given user 103 may have a file library comprising one or more folders stored locally on his/her computer, or on an online cloud storage service. The ownership rules may define that any and all files in that file library, or one or more selected folders within that file library, are to have their primary instance stored in the mailbox 107 of that user 103.

Any other user 103 who has access to any of those files will have a secondary copy maintained in his/her mailbox 107. As another example, a given user 103 may have an online file sharing account comprising one or more folders. The rules may define that any and all files in that file sharing account, or one or more selected folders within that file sharing account, are to have their primary instance stored in the mailbox 107 of that user 103. Again any other user 103 who has access to that one of these files will have a secondary copy maintained in his/her mailbox 107. As another example, a given user 103 may have an account on an online collaborate workspace of site comprising one or more folders, and the rules may define that any and all files in the user's workspace, site or collection of sites, or one or more selected folders within the workspace, site or sites, are owned by that user and therefore have their primary copies in that user's mailbox. Generally such ownership rules may apply to any resource repository, e.g. file library, collection of files, site, site collection, workspace, etc.

Note that where ownership or ownership rules are referred to herein, or such like, this does not necessarily mean the user is the owner in any other sense than he or she is the user having the primary copy stored in his/her mailbox (i.e. storage area) 107. For example it does not necessarily mean the user is the copyright holder. Alternatively for instance, some resources or libraries etc. may be owned in a legal sense by the organization and not to one user. Furthermore, as mentioned, anything described herein in relation to an individual user can also relate to a group of users. Hence for some resources 201, the resource 201 is not owned by an individual user even in the sense of having the primary copy stored in the mailbox of an individual user, but rather may be stored in a mailbox "belonging" to multiple users, e.g. a team within the organization or even the organization as a whole. For these libraries, the system may create "arbitration mailboxes", i.e. mailboxes not owned by any user in particular, and may map each library (at some level) deterministically into one such mailbox.

As well as ownership rules, the manager function 106 also applies one or more further rules for creating and maintaining secondary copies. The ownership rules and/or further rules may be configured to favour performance and/or locality. For locality, the "right" objects are made available locally according to simple rules. For example, according to one preferred rule implemented by the manager function 106, every resource 201 a given user 103 ever accessed is in his/her respective mailbox 107. In embodiments, resources 201 deemed to "trend-around" that user 103 may be included in his/her respective mailbox 107 as well. The trending resources may be generated based on an activity subscription mechanism. For instance, the user gets all activity of the 40 people who he/she works the most with, and when deemed interesting locally, the related items are copied (secondary copies established) in the user's mailbox 107.

Figure 2:
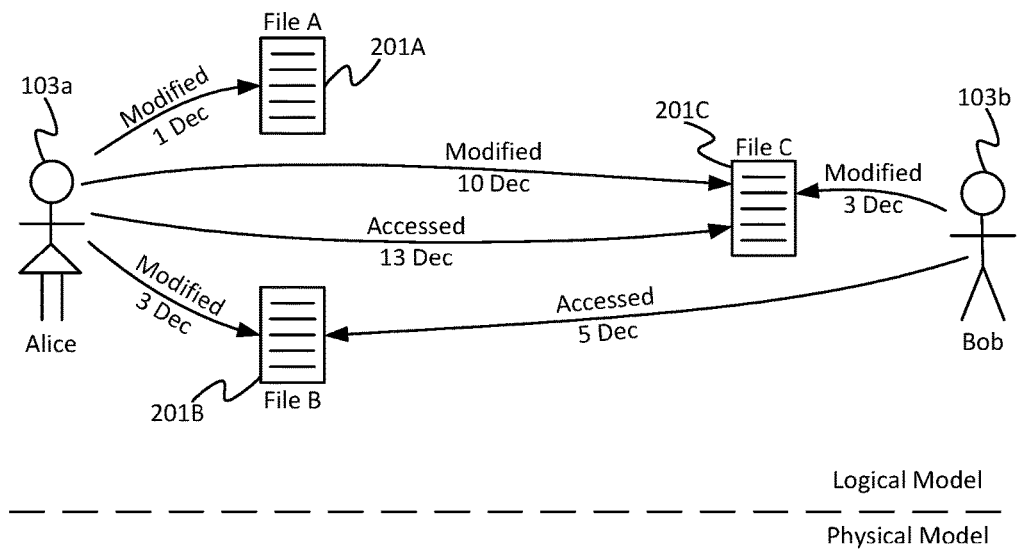
FIG. 2 is a schematic illustration of a logical and physical model of the storage system.
Figure 2:
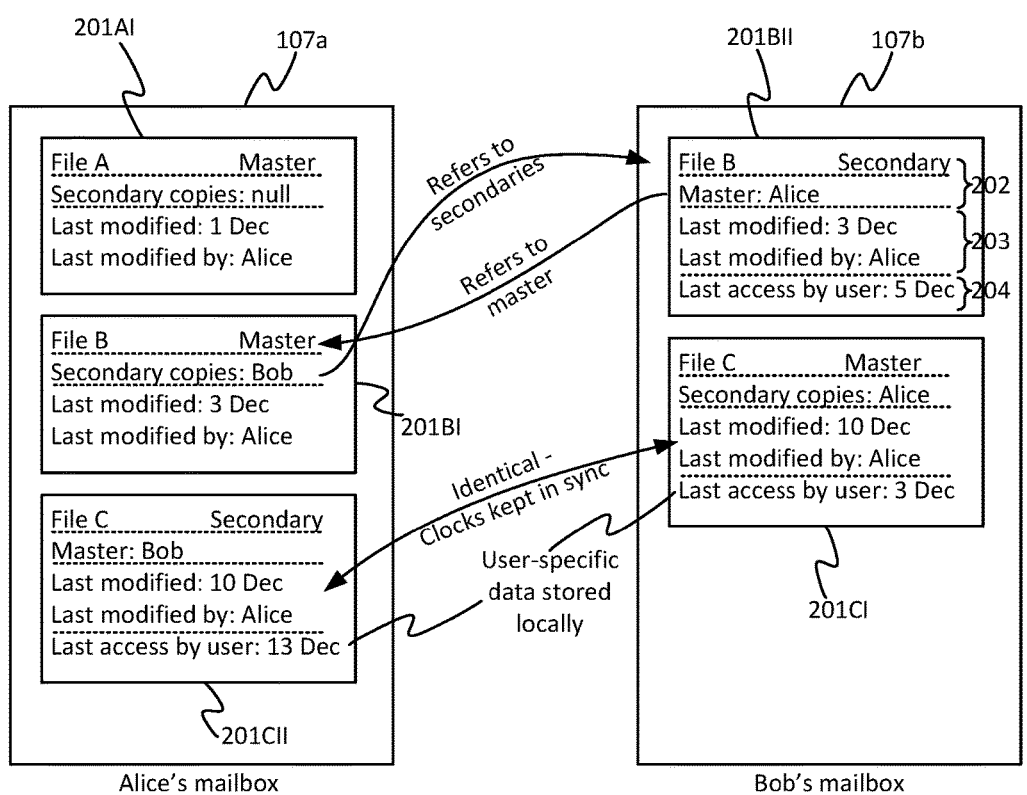

FIG. 2 illustrates a logical model and a physical model of the system, mapping from online storage libraries to mailboxes. The top diagram shows the logical model and the bottom diagram shows the physical model. FIG. 2 also illustrates examples of properties that are shared and synced across mailboxes 107, and by contrast personal properties which are specific to a given user's mailbox.

FIG. 2 illustrates these concepts by reference to an example involving a first user 103*a* (Alice) having a respective mailbox 107*a* instantiated on a first of the server units 104*i*, and a second user (Bob) having a separate respective mailbox 107*b* which may happen to be instantiated on a second of the server units 104*ii*. In the example shown there are three resources: a first file 201A ("File A"), a second file 201B ("File B") and a third file 201C ("File C"). It will be appreciated that in practice the mailboxes 107 may in fact store many more resources than this, and that there may also be many a more complex web of many more relationships involving many more users. Also the resources are not limited to files. This particular example of the two users and three files is given only by way of illustration.

File A and File B belong to Alice. Hence the master (primary) copy 201AI, 201AII of each of File A and File B are each stored in Alice's mailbox 107a. File C belongs to Bob and hence the master (primary) copy 201CI is stored in Bob's mailbox 107b. At some point Alice has had been connected with File B, for example Alice shared File B with Bob, or Bob received a notification about File B as a result of a subscription (e.g. because it was trending, or because Bob has subscribed to all content from Alice, or searched for content from Alice, etc.). In response the manager function 106 automatically creates a secondary copy of File B in Bob's mailbox 107b.

Similarly, at some point Alice has come into contact with File C, Bob's file. Again this could for example be because Bob shared File C with Alice, or because of a subscription that Alice has notifying her of content from Bob, or as a result of a search query, etc. In response, the manager function 106 automatically creates a secondary copy of File C in Alice's mailbox 107a.

Note that in embodiments the system allows another user other than the owner to modify a resource 201, e.g. to make changes to a document despite the fact that he/she is not the author. In this case the other user modifies the primary copy 201I, i.e. the owner's copy, and the manager function 106 then propagates the modification back down to the other user's mailbox 107. So if Alice authored or published File B, Bob can edit it, in which case he edits the primary copy 201B in Alice's mailbox 107a, and then the edits are propagated back to his secondary copy on his own mailbox 107b. When Bob views File B however, he views the local, secondary copy from his own mailbox 107b.

In embodiments further, one or both of the primary and secondary copies 201I, 201II of any given resource could be absolute copies. That is, the actual data content of the file is stored explicitly (i.e. directly) in the respective mailbox 107 itself (as opposed to being stored in the form of a link). However, an alternative possibility is that one or both of the primary and secondary copies 201I, 201II of any given resource could be "shallow" copies. A shallow copy is a copy that is stored in the respective mailbox 107 in the form of a link, linking to the actual data content of the resource stored elsewhere, e.g. externally to the server system (e.g. a third party server). Note therefore that the term "copy" as used herein does not necessarily refer to a full duplication of the actual data content of a resource, and could also refer to a copy stored in the form of a link. In one particular example, one, some or all of the primary copies 201I could be stored as absolute copies, and the respective secondary copies could be stored as shallow copies linking to the absolute primary copies. As another example, one some or all of the primary copies themselves could be shallow copies linking to the content of the respective resource as stored elsewhere, such as an online file system. For example the ultimate source to which the primary copy links could be an underlying online cloud file system or file sharing service run by a provider of the server system, or a third-party file sharing or cloud-storage service.

Irrespective of whether the content of the resource 201 is stored in absolute terms or as a shallow copy, each of the primary and secondary copies 201I, 201II comprises metadata.

The metadata comprises at least a first portion of metadata 202, which may be referred to as connecting metadata. This metadata 202 specifies whether the copy is a primary (i.e. master) copy or a secondary copy, and if it is a primary copy what secondary copies there are (if any), or if it is a secondary copy then which is the primary copy. E.g. the former may be specified in terms of which user(s) 103 have a secondary copy (if any), and the latter may be specified in terms of which user 103 owns the primary copy. This metadata is preferably always stored in absolute terms (i.e. directly/explicitly) on the respective mailbox 107 itself (i.e. not in the form of a link), regardless of whether the content of the resource is stored in absolute terms or shallow form.

The metadata may also comprise common metadata 203 which is common across all primary and secondary instances 201I, 201II of the same resource 201. An example is the last time or date when the resource 201 was modified by any user, the identity of the last user to modify the resource 201, the title of the resource 201, and/or the file size. This information is the same regardless of whose mailbox 107 the copy is in. Hence this metadata could be stored in absolute terms or shallow form.

Alternatively or additionally, the metadata may comprise personal metadata 204 (personal in the sense that it is specific to a particular user, not necessarily in the sense of being private). An example is the last time or date when the resource 201 was modified by the particular user 103 whose mailbox 107 the particular copy in question is stored in (so the last time modified by Bob in the case of the secondary copy of File B, for instance). Such metadata is specific to the individual user 103 whose mailbox 107 the copy is stored in. Hence this metadata is preferably always stored in absolute terms (i.e. directly/explicitly) on the respective mailbox 107 itself (i.e. not in the form of a link), regardless of whether the content of the resource is stored in absolute terms or shallow form.

The reference numerals for the different portions of metadata 202, 203, 204 are only shown against the secondary copy of File B (201BII) in FIG. 2, but it will be understood that similar metadata maybe present in each instance of each file or resource.

As some of the metadata is shared between different instances of the same resource 201, whereas some is specific to the particular copy 201I, 201II, then the manager function is configured to treat the two different categories of metadata differently when establishing a secondary copy 201II, and also to treat the two different categories of metadata differently when propagating modifications from the primary copy 201I to the secondary copies 201II.

That is, when the manager function 106 makes a copy of the primary copy 201I of a resource 201 from the owner's mailbox 107, copied into the mailbox of the other user(s) 103, then the manager function copies over only the common metadata 203, i.e. the metadata that is common across different instances 201I, 201II of a given resource 201. The connecting metadata 202 and the personal metadata 204 will be specific to the particular secondary copy 201II, and hence the manager function 106 will instead create dedicated values of these metadata element for the particular secondary copy 201II currently being created.

Furthermore, when the manager function 106 propagates a modification of the primary copy 201I of a resource 201 from the owner's mailbox 107, being propagated to the mailbox(es) 107 of the other user(s) 103, then the manager function 106 propagates only the modification to the common metadata 203, i.e. again the metadata that is common across different instances 201I, 201II of a given resource 201. As the connecting metadata 202 and the personal metadata 204 are specific to each particular secondary copy 201II, the manager function 106 will not overwrite the values of these metadata values in secondary copies 201II when propagating changes.

By way of example, consider File B shown in FIG. 2, of which Alice is the owner and Bob has a secondary copy 201BII. The metadata 203 indicating when the resource was last modified (globally) is common to both the primary copy 201BI and the secondary copy 201BII. When File B is modified (e.g. by Alice), on 3 December, this new value of this common data is propagated through the graph to all secondary copies including Bob's secondary copy 201BII. On the other hand, the metadata 204 indicating when the resource was last accessed specifically by Alice is locally relevant only to Alice's own mailbox 107a, and the corresponding value of that metadata 204 indicating specifically when Bob last accessed the resource is relevant only to Bob's own mailbox 107b. Hence when File B is modified, e.g. by Alice, this change is not propagated through to Bob's mailbox 107b. Or if Bob modifies File B, the personal last-modified value is not modified in Alice's personal metadata 204 on the primary copy.

It will be appreciated that the above embodiments have been described by way of example only.

More generally, according to one aspect disclosed herein there is provided a server system comprising: a physically separate storage area for each of a plurality of respective parties including a first party and a second party, each of at least some of the storage areas storing a primary instance of one or more data resources of the respective party; and a manager function configured to perform operations of: in response to the second party forming a relationship with one of the resources of the first party, establishing a secondary copy of said one of the resources of the first party in the respective storage area of the second party; and when the primary instance is updated with a change, propagating the change in the primary instance to the secondary copy in the second party's storage area.

In embodiments, at least some of the separate storage areas, including at least the respective storage areas of the first and second parties, may be implemented on separate server units in separate housings, racks, rooms, buildings or geographic locations.

In embodiments, the manager function may be implemented in a distributed form comprising a respective instance of the manager function at each of the server units.

In embodiments, the manager function may be configured to implement the propagation between the server units via email, and to intercept the email upon receipt so that the email is not presented the second user but instead is used to automatically update the secondary copy.

In embodiments, the manager function may be further configured so as: if the second party modifies said one of the resources of the first user to produce said change, the manager function implements the change to the primary instance in the storage area of the first party and propagates the change the to the secondary copy in the storage area of the second party, and to secondary copies in the storage areas of any others of the parties having a relationship with said one of the resources.

In embodiments, the secondary copy may be stored in the storage area of the second party in the form of a link to the resource. Alternatively the secondary copy may be stored on the storage area as an absolute copy comprising a duplication of the content of the primary instance.

In embodiments, the primary instance may be stored in the storage area of the first party in the form of a link to the resource stored elsewhere. Alternatively the primary instance may be an absolute instantiation comprising the content of the resource stored on the storage area of the first party.

In embodiments, each of the resources may comprise any one of a set of resource types, the set of resource types comprising any two or more of: files, stored communications, sites, and/or user profile information.

In embodiments, the forming of said relationship may comprise viewing the resource, modifying the resource, subscribing to the resource, or the resource trending around the second user.

In embodiments, the resources may comprise resources from a set of multiple types of application, said set of types of application comprising any two or more of: word processing application, spreadsheet application, slideshow application, calendar application, email client, IM client, social media application, and/or file sharing application.

In embodiments, the storage area of each of multiple of said parties, including the first party and a plurality of further parties, may store a primary instance of one or more of the party's own respective resources with which a respective one or more others of the parties have a relationship, the manager function storing a respective one or more secondary copies in the storage areas of the respective other parties; the manager function may be configured to propagate changes to any of the primary instances to each of the respective secondary copies; and the manager function may be configured to maintain a graph of the relationships between parties and the resources, and to use said graph to perform said propagation.

In embodiments, the manager function may be configured to apply one or more mapping rules to determine which one or more of the resources are to have the primary instance stored on which of the parties' storage areas, said one or more rules comprising any one or more of: all files from a file library of the respective party, or all files within a selected one or more folders of the file library, are to have the primary instance stored in the storage area of the respective party; all files from a cloud storage account of the respective party, or all files within a selected one or more folders of the cloud storage account, are to have the primary instances stored in the storage area of the respective party; all files from an online file sharing account of the respective party, or all files within a selected one or more folders of the file sharing account, are to have the primary instances stored in the respective storage area of the respective party; all resources from an online site or collection of sites of the respective party, or all resources within a selected division within the site or sites, are to have the primary instance stored on the storage area of the respective party; and/or all documents from an online collaborative workspace of the respective party, or all resources within a selected subspace of the collaborative workspace, are to have the primary instance stored on the storage area of the respective party.

In embodiments, said relationship or relationships between parties and resources may be constrained to within a given organization.

In embodiments, each of one, some or all of the parties, including at least the first and/or second party, may be an individual user. In embodiments, each of one, some or all of the parties, including at least the first and/or second party, may be a group of users According to another aspect disclosed herein, there is provided a method of operating a server system, the method comprising: providing a physically separate storage area for each of a plurality of respective parties including a first party and a second party; on each of at least some of the storage areas, storing a primary instance of one or more data resources of the respective party; in response to the second party forming a relationship with one of the resources of the first party, establishing a secondary copy of said one of the resources of the first party in the respective storage area of the second party; and when the primary instance is updated with a change, automatically propagating the change in the primary copy to the secondary copy in the second party's storage area.

In embodiments the method may comprise operations corresponding to any of the above system features.

In further embodiments, at least some of the separate storage areas may be implemented on separate server units in separate housings, and the method further comprises scaling up the server system to accommodate more of said parties by adding an extra one or more of said server units.

In embodiments the method may further comprise, when the first or second party moves to a different geographic location, migrating the storage area to a corresponding geographic region.

Other applications and variants of the techniques disclosed herein may become apparent to a person skilled in the art once given the present disclosure. The scope of the present disclosure is not limited by the above-described embodiments but only by the accompanying claims.

The invention claimed is:

1. A server system comprising:
   a physically separate storage area for each of a plurality of respective parties including a first party and a second party, at least one of the storage areas comprising a first storage area storing a primary instance of a data resource of the first party; and
   a manager function configured to perform operations of:
   in response to determining the second party is allowed access to the data resource of the first party, establishing a secondary copy of the data resource of the first party in a second storage area of the second party; and
   when the second party modifies the data resource of the first party, modifying the primary instance of the data resource in the first storage area and propagating the modification from the primary instance to the secondary copy in the second storage area.

2. The server system of claim 1, wherein at least some of the physically separate storage areas, including at least the first storage area and the second storage area, are implemented on separate server units in separate housings, racks, rooms, buildings or geographic locations.

3. The server system of claim 2, wherein the manager function is implemented in a distributed form comprising a respective instance of the manager function at each of the server units.

4. The server system of claim 2, wherein the manager function is configured to implement the propagation between the server units via email, and to intercept the email upon receipt so that the email is not presented to the second party but instead is used to automatically update the secondary copy.

5. The server system of claim 1, wherein, when the second party modifies the data resource of the first party, the manager function is further configured to propagate the modification to secondary copies in the storage areas of any others of the plurality of parties allowed access to the data resource of the first party.

6. The server system of claim 1, wherein the secondary copy is stored in the second storage area of the second party in the form of a link to the data resource.

7. The server system of claim 1, wherein the secondary copy is stored as an absolute copy comprising a duplication of content of the primary instance.

8. The server system of claim 1, wherein the primary instance is stored in the first storage area of the first party in the form of a link to the data resource stored elsewhere.

9. The server system of claim 1, wherein the primary instance is an absolute instantiation comprising content of the data resource stored in the first storage area of the first party.

10. The server system of claim 1, wherein one or more data resources of the plurality of parties comprises any one of a set of data resource types, the set of data resource types comprising any two or more of: files, stored communications, sites, and/or user profile information.

11. The server system of claim 1, wherein the second party's access to the data resource of the first party comprises viewing the data resource, modifying the data resource, subscribing to the data resource, or the data resource trending around the second party.

12. The server system of claim 1, wherein the data resource comprises data resources from a set of multiple types of application, the set of multiple types of application comprising any two or more of: word processing application, spreadsheet application, slideshow application, calendar application, email client, IM client, social media application, and/or file sharing application.

13. The server system of claim 1, wherein:
   the storage areas of each of multiple of the plurality of parties, including the first party and one or more further parties, store primary instances of one or more of the party's own respective data resources with which a respective one or more others of the parties are allowed access to, the manager function storing a respective one or more secondary copies in the storage areas of the respective other parties;
   the manager function is configured to propagate changes to any of the primary instances to each of the respective secondary copies; and
   the manager function is configured to maintain a graph of relationships between parties and the data resources, and to use the graph to perform the propagation.

14. The server system of claim 13, wherein the manager function is configured to apply one or more mapping rules to determine which one or more of the respective data resources are to have the primary instance stored on which of the parties' storage areas, the one or more mapping rules comprising one or more of:
   all files from a file library of the respective party, or all files within a selected one or more folders of the file library, are to have the primary instance stored in the storage area of the respective party;
   all files from a cloud storage account of the respective party, or all files within a selected one or more folders of the cloud storage account, are to have the primary instances stored in the storage area of the respective party;
   all files from an online file sharing account of the respective party, or all files within a selected one or more folders of the online file sharing account, are to have the primary instances stored in the respective storage area of the respective party;
   all resources from an online site or collection of sites of the respective party, or all resources within a selected division within the online site or the collection of sites, are to have the primary instance stored on the storage area of the respective party; and/or all documents from an online collaborative workspace of the respective party, or all resources within a selected subspace of the online collaborative workspace, are to have the primary instance stored on the storage area of the respective party.

15. The server system of claim 13, wherein the relationships between the parties and the data resources are constrained to within a given organization.

16. The server system of claim 1, wherein one or more of the plurality of parties is an individual user.

17. The server system of claim 1, wherein one or more of the plurality of parties is a group of users.

18. A method of operating a server system, the method comprising:
   providing a physically separate storage area for each of a plurality of respective parties including a first party and a second party;
   within at least one of the storage areas comprising a first storage area, storing a primary instance of a data resource of the first party;
   in response to determining the second party is allowed access to the data resource of the first party, establishing a secondary copy of the data resource of the first party in a second storage area of the second party; and
   when the second party modifies the data resource of the first party, modifying the primary instance of the data resource in the first storage area and propagating the modification from the primary instance to the secondary copy in the second storage area.

19. The method of claim 18, wherein at least some of the physically separate storage areas are implemented on separate server units in separate housings, and the method further comprises scaling up the server system to accommodate additional parties by adding an extra one or more of said server units.

20. The method of claim 18, comprising, when the first party or the second party moves to a different geographic location, migrating the first storage area or the second storage area to a corresponding geographic region.

* * * * *